(12) United States Patent
Zhou (10) Patent No.: US 9,651,814 B2
(45) Date of Patent: May 16, 2017

(54) EMBEDDED TOUCH DISPLAY DEVICE (71) Applicant: Shanghai Tianma Micro-Electronics Co., Ltd., Shanghai (CN)

(72) Inventor: Xingyao Zhou, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 148 days.

(21) Appl. No.: 14/088,256

(22) Filed: Nov. 22, 2013

(65) Prior Publication Data

US 2014/0078421 A1 Mar. 20, 2014

Related U.S. Application Data (63) Continuation of application No. PCT/CN2012/086113, filed on Dec. 7, 2012.

(30) Foreign Application Priority Data

Aug. 27, 2012 (CN) .......................... 2012 1 0308846

(51) Int. Cl.
*G02F 1/1335* (2006.01)
*G02F 1/1333* (2006.01)
(Continued)

(52) U.S. Cl.
CPC .......... *G02F 1/13338* (2013.01); *G02F 1/141* (2013.01); *G06F 3/044* (2013.01);
(Continued)

(58) Field of Classification Search
CPC ...... G06F 3/044; G06F 3/0412; G06F 3/0488; G06F 3/04883; G06F 3/045;
(Continued)

(56) References Cited

U.S. PATENT DOCUMENTS 5,122,787 A * 6/1992 Fujita et al. .................... 345/97
5,805,129 A 9/1998 Inaba et al.
(Continued)

FOREIGN PATENT DOCUMENTS

CN 1723517 A 1/2006
CN 101055395 A 10/2007
(Continued)

OTHER PUBLICATIONS

Search Report for PCT Application No. PCT/CN2012/086113, dated Jun. 6, 2013.
(Continued)

*Primary Examiner* — Nathanael R Briggs
*Assistant Examiner* — William Peterson
(74) *Attorney, Agent, or Firm* — Alston & Bird LLP (57) ABSTRACT

An embedded touch display device includes a first substrate (100) and a second substrate (200) which are opposite to each other, a liquid crystal display unit and a capacitive touch unit disposed between the first substrate and the second substrate. The liquid crystal display structure includes a pixel electrode layer (120), a common electrode layer and a liquid crystal layer (30), the pixel electrode layer (120) and the common electrode layer are located on two sides of the liquid crystal layer (30), and liquid crystal (30) in the liquid crystal layer (30) is ferroelectric liquid crystal.

8 Claims, 4 Drawing Sheets (51) Int. Cl.
*G02F 1/141* (2006.01)
*G06F 3/044* (2006.01)
*G06F 3/041* (2006.01)
*G02F 1/1337* (2006.01)

(52) U.S. Cl.
CPC .......... *G06F 3/0412* (2013.01); *G06F 3/0416* (2013.01); *G02F 2001/133738* (2013.01); *G02F 2001/133773* (2013.01)

(58) Field of Classification Search
CPC .... G06F 3/0416; G02F 1/13338; G02F 1/141; G02F 2001/133738; G02F 2001/133773; G02F 1/133
USPC .................................... 349/12; 345/173, 174
See application file for complete search history.

(56) References Cited

U.S. PATENT DOCUMENTS

| | | | |
|---|---|---|---|
| 7,924,350 B2* | 4/2011 | Ma et al. | 349/12 |
| 2006/0083868 A1 | 4/2006 | Sawatari et al. | |
| 2008/0062139 A1 | 3/2008 | Hotelling et al. | |
| 2010/0007832 A1* | 1/2010 | Sawatari | G02F 1/133734 349/125 |
| 2010/0136868 A1 | 6/2010 | Chien et al. | |
| 2010/0188354 A1* | 7/2010 | Tamura | 345/173 |
| 2010/0302201 A1 | 12/2010 | Ritter et al. | |
| 2011/0007020 A1 | 1/2011 | Hong et al. | |
| 2011/0242444 A1 | 10/2011 | Song | |
| 2013/0050130 A1* | 2/2013 | Brown | 345/174 |
| 2013/0176276 A1* | 7/2013 | Shepelev | G06F 3/044 345/174 |

FOREIGN PATENT DOCUMENTS

| | | |
|---|---|---|
| CN | 101251667 A | 8/2008 |
| CN | 101290593 A | 10/2008 |
| CN | 101794038 A | 8/2010 |
| CN | 102375629 A | 3/2012 |
| EP | 2447814 A2 | 5/2012 |
| JP | 63-204313 A | 8/1988 |
| JP | 2009036861 A | 2/2009 |

OTHER PUBLICATIONS

Extended European Search Report for European Application No. 12876074.1, mailed on Mar. 31, 2015, 8 pages total.

Li et al. "P-61: Mesogenic Poly Network Stabilized Twisted Ferroelectric Liquid Crystal-Display Exhibiting Fast Response Speed," LC Lab, Changchun Institute of Physics Chinese Chinese Academy of Sciences, pp. 779-781, 2000.

European Search Report as issued in corresponding European Application No. 12876074.1, dated Aug. 24, 2015.

Asao, Y., et al,. "Dot Inversion Spontaneous Polarization Structure in the Half-V-shaped Switching Ferroelectric Liquid Crystal Mode," Japanese Journal of Applied Physics, 2003, vol. 42, pp. 554-558.

Murakami, Y., et al., "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics," Japanese Journal of Applied Physics, 2003, vol. 42, pp. 2759-2761.

* cited by examiner

EMBEDDED TOUCH DISPLAY DEVICE

CROSS-REFERENCES TO RELATED APPLICATIONS

The present application claims priority to and is a continuation of PCT/CN2012/086113, filed on Dec. 7, 2012, entitled "EMBEDDED TOUCH DISPLAY DEVICE", which application claims the benefit of Chinese Patent Application No. 201210308846.2, filed with the Chinese Patent Office on Aug. 27, 2012, and entitled "EMBEDDED TOUCH DISPLAY DEVICE", the contents of which are incorporated herein by reference in their entirety.

FIELD OF THE INVENTION

The present invention relates to the field of liquid crystal display, and in particular to an embedded touch display device.

BACKGROUND OF THE INVENTION

Touch display devices on the market are mostly separated touch screens, and the separated touch screen is obtained by assembling a touch panel and a liquid crystal panel manufactured separately together. The obtained display device is rather thick, and since multiple layers of glass and film are added, the light transmittance and the contrast gradient of the display screen are noticeably lower. Moreover, the cost of the above mentioned touch display device is high. In order to make the liquid crystal display device with the touch panel lighter, thinner, and having good display effects and with low-cost, embedded touch technology emerges, which involves new technology for integrating the touch panel with the liquid crystal panel. Specifically, the touch technology of the touch panel may be implemented by a capacitive touch control, a resistive touch control, infrared touch control or the like, and the structure of the liquid crystal panel may be implemented by a common Twisted Nematic Liquid Crystal (TN) mode, In Plane Switching Liquid Crystal (IPS) mode, Fringe Field Switching Liquid Crystal (FFS) mode or the like. Currently, the main developing trend of the embedded touch technology refers to an On-Cell embedded touch display device and an In-Cell embedded touch display device.

For the On-Cell embedded touch display device, the touch sensor is provided on the liquid crystal panel. The liquid crystal panels and the touch components need to be assembled by bonding. In this manner, improving the success rate of bonding and reducing the times for bonding are keys of the touch panel processing technology.

For the In-Cell embedded touch display device, the touch sensor is embedded into the liquid crystal pixels. The manufacture of the touch sensing elements may be completed according to the TFT LCD standard processing. Moreover, there are no problems of screen face bonding and components in alignment, the weight and the thickness are reduced greatly, and thus the device is lighter and thinner. In addition, the viewing angle of the device may not be affected, and the light transmittance of the panel and the picture quality of the screen are much better.

In summary, usage effects of the embedded touch display devices produced by prior arts are not ideal.

BRIEF SUMMARY OF THE INVENTION

Embodiments of the present invention provide novel techniques and devices to solve non-ideal usage effects of conventional embedded touch display devices.

To solve the above problems, embodiments of the present invention provide an embedded touch display device. The embedded touch display device includes: a first substrate and a second substrate which are opposite to each other; and a liquid crystal display unit and a capacitive touch unit disposed between the first substrate and the second substrate, where the liquid crystal display unit includes a pixel electrode layer, a common electrode layer and a liquid crystal layer. The pixel electrode layer and the common electrode layer are disposed respectively on two opposite sides of the liquid crystal layer, and the liquid crystal in the liquid crystal layer includes a ferroelectric liquid crystal material.

DETAILED DESCRIPTION OF THE INVENTION

An embedded capacitive touch display device includes a capacitive touch unit and a liquid crystal display unit. Specifically, the capacitive touch unit includes a touch sensor which includes touch electrodes. The touch electrodes include driving electrodes and sensing electrodes. Display electrodes in the liquid crystal display unit include pixel electrodes and common electrodes. There are parasitic capacitances between the touch electrodes and the display electrodes which are disposed closest to the touch electrodes in the liquid crystal display unit, and the parasitic capacitances would seriously affect the signal to noise ratio of the capacitive touch unit.

Figure 1:
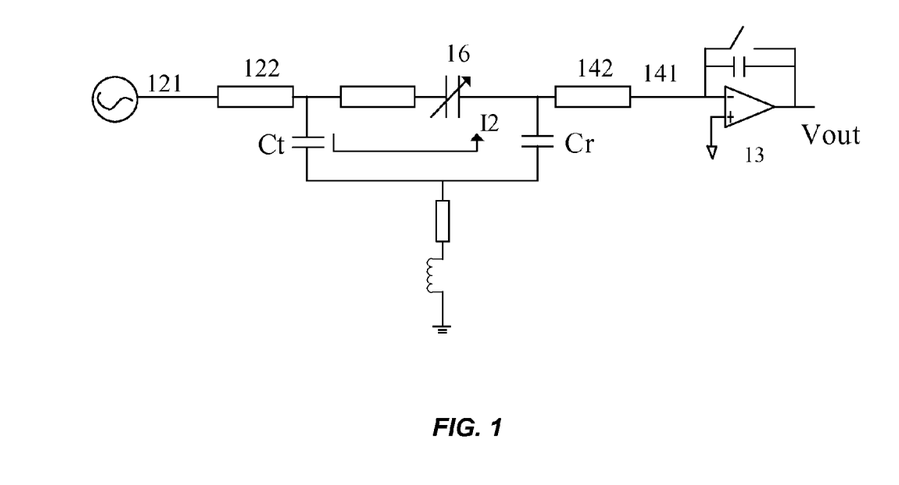
FIG. 1 is an equivalent circuit diagram of a touch electrode in an embedded capacitive touch display device.

FIG. 1 illustrates an equivalent circuit of a crossover point of a driving electrode and a sensing electrode in an embedded capacitive touch display device, where Ct and Cr respectively denote the parasitic capacitances between the driving electrode of the touch screen and other display electrodes in the liquid crystal display unit and between the detection electrode of the touch screen and the other display electrode in the liquid crystal display unit. The driving electrode is shown as equivalent to a driving line 121 and a resistance 122, the sensing electrode is shown as equivalent to a sensing line 141 and a resistance 142, and a mutual capacitance 16 is formed at each crossover point of the driving electrode and the sensing electrode. There is a parasitic capacitance Ct between the driving electrode and the ground, and there is a parasitic capacitance Cr between the sensing electrode and the ground. A touch detection circuit 13 has a charge amplifier, which converts the current of the sensing electrode into a voltage signal output Vout. When the touch panel (the touch unit) is touched by a finger, the mutual capacitance 16 at the touch point is changed, resulting in the variation of output current I of the sensing electrode, and thus the output voltage Vout varies.

If the liquid crystal display unit is filled with the liquid crystal in a TN mode, the parasitic capacitance would have a stronger effect on the touch electrode. The TN mode is a liquid crystal mode where nematic liquid crystals with liquid crystal molecules having twist angle of 90° is used, and the TN mode is a basic liquid crystal mode of a liquid crystal panel. The TN mode liquid crystal panel is configured as below: nematic liquid crystal is injected between glass substrates with transparent electrodes, and polarizers are provided on the outside of the glass substrates. The transparent electrodes include common electrodes and pixel electrodes. The 90° twist of the nematic liquid crystal molecules is achieved by mutually perpendicular rubbing and anchoring of alignment films on the surfaces of the glass substrates, i.e., the alignment films located on the upper surface and lower surface of the nematic liquid crystal layer. It is known by those skilled in the art that before the liquid crystal is used in a display, the liquid crystal molecules need to be oriented towards a certain direction, which is referred to as alignment. Generally, the method of alignment is as follows: coating polyimide resin on opposite surfaces of the upper glass substrate and the lower glass substrate to form a thin film, and then rubbing the resin along a certain direction by using a rubbing cloth (rubbing process) to form tiny gaps, and in this manner the liquid crystal molecules may be oriented towards the same direction along the gaps. The resin film in which the tiny gaps are formed in a certain direction is referred to as an alignment film.

The liquid crystal molecule is a rod-like molecule with a long axis and a short axis, and the permittivity of the liquid crystal molecule in the long axis direction is different from that in the short axis direction. In the case where images are displayed in a TN mode liquid crystal display unit, the liquid crystal molecules rotate from a horizontal direction to a vertical direction or from a vertical direction to a horizontal direction. The rotational angle is large, resulting in great variation of the permittivity of the liquid crystal layer, which in turn seriously affects the changes of the parasitic capacitances Ct and Cr. Therefore, the output current I of the sensing electrode is changed, and the output voltage Vout is changed, resulting in seriously effect on the sensitivity of the touch electrode of the touch screen.

The inventor solved the above problems by replacing the nematic liquid crystal with ferroelectric liquid crystal after a long research and experimental efforts. Because the ferroelectric liquid crystal can realize a rather small rotation angle, the variation of the permittivity of the liquid crystal layer is decreased.

Figure 5:
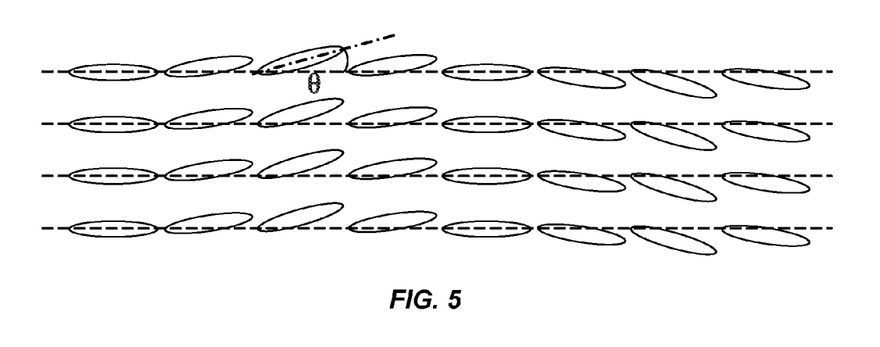
FIG. 5 is a schematic diagram of replacing nematic liquid crystal with ferroelectric liquid crystal in a liquid crystal layer in a TN mode.

Specifically, the ferroelectric liquid crystal is the liquid crystal with ferroelectricity, which is mainly smectic C* phase (chiral smectic C phase). The smectic C phase may be obtained by cooling the nematic phase at a certain temperature, and the smectic C phase composed of the chiral carbon is the smectic C* phase. All these three liquid crystal molecules are comprised of rod-like or strip-like molecules which are arranged in layers, where the long axes of molecules in the nematic liquid crystal molecule layer are parallel and the direction of the long axes is perpendicular to the normal line of the layer. The long axes of molecules in the smectic C phase liquid crystal molecule layer are parallel and the direction of the long axes is inclined to the normal line of the layer. The smectic C* phase liquid crystals are arranged to be a layer-like structure, as shown in FIG. 5. The angle between the long axis of the molecule in the layer and the normal line of the layer is θ, molecules in each layer are distributed on the surface of a cone with a vertex angle of 2θ, and liquid crystal molecules in each layer have the same inclination angle. However, in the adjacent layers, the offset angle of liquid crystal molecules changes with a helical structure, such that the liquid crystal molecules along the same normal line of the layer are arranged in a helical structure. An inclined smectic liquid crystal composed of the smectic C* phase (chiral smectic C phase liquid crystal) may have no mirror symmetry, and thus may have a spontaneous polarization dipole moment and have a ferroelectric property, so it is referred to as ferroelectric liquid crystal.

The principle of the ferroelectric liquid crystal display is as follows. Similar to the metal in the magnetic field, ferroelectric liquid crystal molecules may form an accurate and ordered arrangement when affected by an external electric field. The ferroelectric liquid crystal molecules may be regularly arranged on a conical surface rotatably under the action of an electric field, and modulation of the light transmission intensity may be achieved by the rotation of the liquid crystal molecules. In this way, the light and shade display may be generated under the action of the electric field. A desired image may be formed by controlling every pixel according to the principle. Because the rotation of the ferroelectric liquid crystal molecule is a result of coupling of an external electric field and the electric dipole moment, and the molecules do a conical surface rotation, advantages such as fast response and wide viewing angle may be obtained.

In order to make the above objects, features and advantages of the present invention more apparent and easier to be understood, specific embodiments of the present invention will be described in detail below in conjunction with the accompanying drawings.

Many specific details are described in the description below for full understanding of the present invention. However, the present invention may also be implemented by many other methods different from the description herein, and similar extension may be made by those skilled in the art without departing from the connotation of the present invention. Therefore, the present invention is not limited to the specific embodiments disclosed below.

First Embodiment

In a first embodiment, nematic liquid crystal in the TN mode is replaced by Semi-V shaped ferroelectric liquid crystal.

Figure 2:
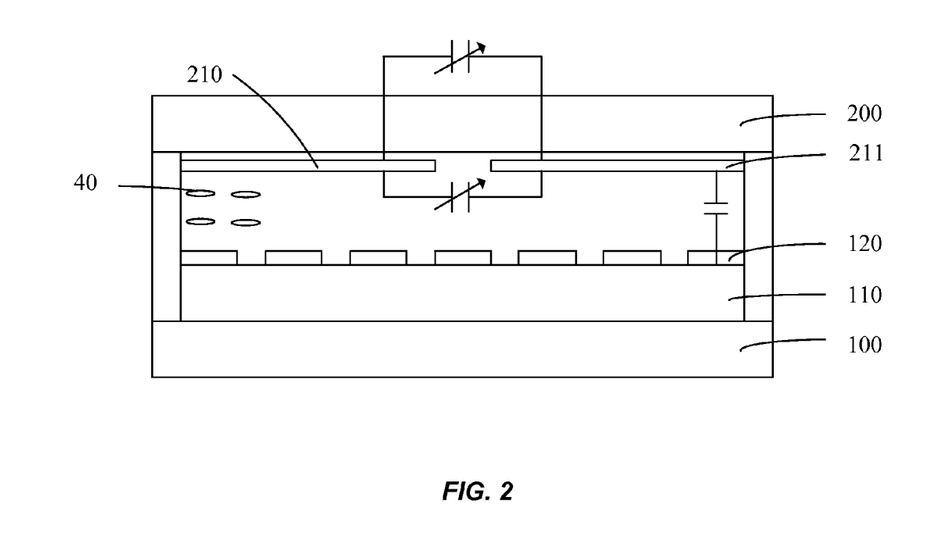
FIG. 2 is a schematic structural diagram of a TN mode capacitive embedded touch display device in the prior art.

A TN mode capacitive embedded touch display device in the prior art is shown in FIG. 2, which includes a first substrate 100 and a second substrate 200 disposed to be opposite to each other, and a liquid crystal display unit and a capacitive touch unit disposed between the first substrate 100 and the second substrate 200, where the liquid crystal display unit includes a pixel electrode layer 120, a common electrode layer and a liquid crystal layer 30. The pixel electrode layer 120 and the common electrode layer are disposed respectively on two sides of the liquid crystal layer, and the liquid crystal in the liquid crystal layer 30 is nematic liquid crystal.

The opposite surfaces of the first substrate 100 and the second substrate 200 are covered with alignment films, and the 90° twist of the nematic liquid crystal molecules in the liquid crystal layer 30 is achieved by mutually perpendicular rubbing and anchoring of the alignment films.

The first substrate and the second substrate are made of a transparent insulating material. In the embodiment, the first substrate and the second substrate are formed of glass panels generally used in the manufacturing field of liquid crystal panel. A TFT array layer 110 is also provided between the pixel electrode 120 and the first substrate 100. The material of the pixel electrode layer 120 and the common electrode layer are transparent conductive material, and the main material of the TFT array layer 110 is transparent conductive material. In the embodiment, the transparent conductive material may be indium tin metal oxide generally used in the manufacturing field of liquid crystal panel. In the Figure, the common electrode includes a common electrode 210 and a common electrode 211 separated with each other, which may also serve as the touch unit of the capacitive touch unit which includes sensing electrodes and driving electrodes. The common electrode in the liquid crystal display unit may serve as the touch unit, which may be realized by inputting different voltage at different time to perform different function at different time. The touch operating time is rather short, which is about 10% of display refresh time, and the liquid crystal molecules do not have enough time to response in the period of voltage change, therefore the sharing of the common electrode and the touch electrode has almost no serious effect on the display.

Similarly, in other embodiments, the common electrode may serve as only one of the driving electrode and the sensing electrode of the touch electrode, and the other one is disposed on the liquid crystal layer. For example, the common electrode serves as the driving electrode, and the surface of the side of the liquid crystal layer on which the common electrode is formed is covered with an insulating layer which is covered with the sensing electrode. Alternatively, the common electrode serves as the sensing electrode, and the surface of the side of the liquid crystal layer on which the common electrode is formed is covered with an insulating layer which is covered with the driving electrode.

Figure 3:
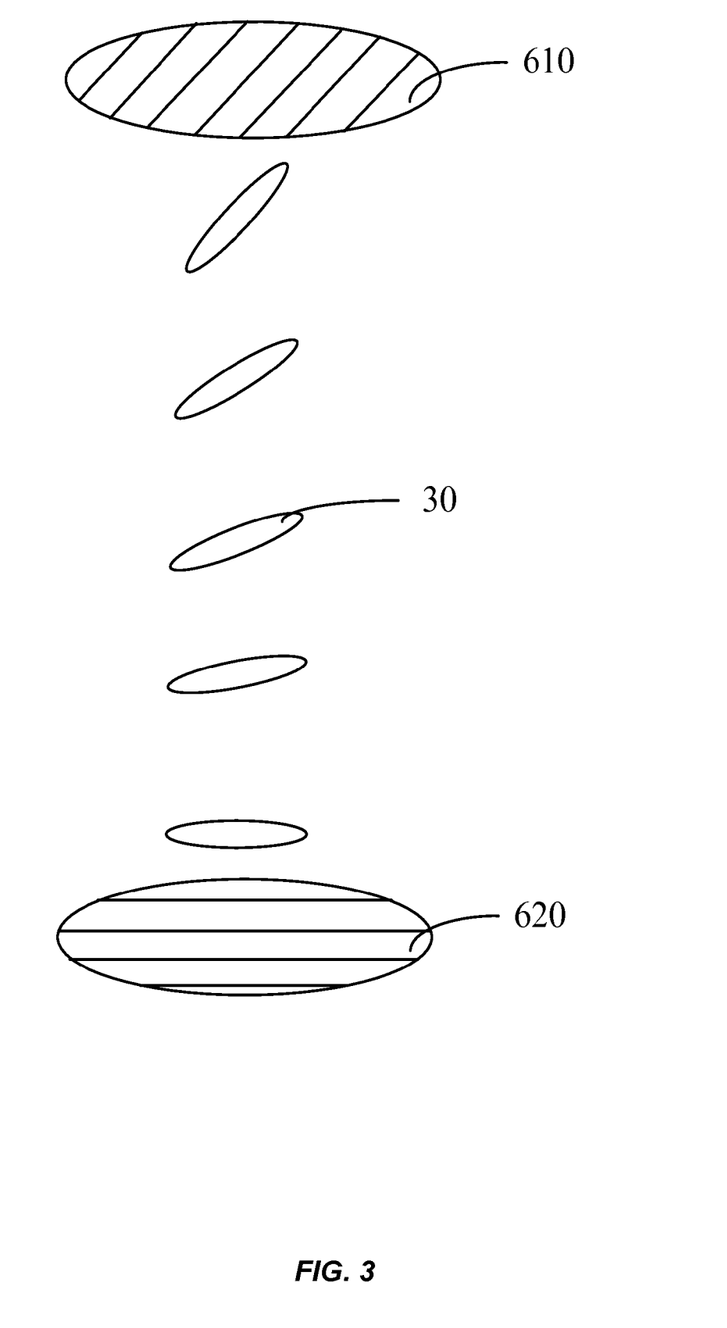
FIG. 3 is a schematic diagram of an arrangement of an upper polarizer, a lower polarizer and liquid crystal molecules in an Off state of a TN mode in the prior art.
Figure 4:
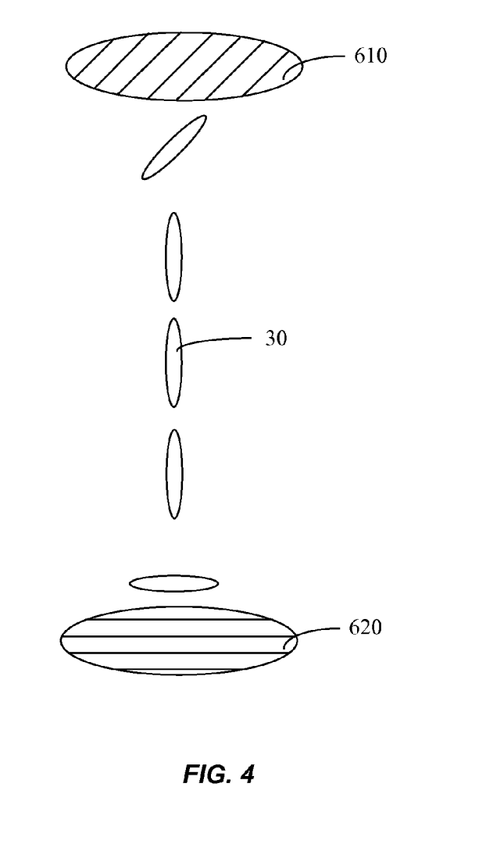
FIG. 4 is a schematic diagram of an arrangement of an upper polarizer, a lower polarizer and liquid crystal molecules in an On state of a TN mode in the prior art.

The arrangement of an upper polarizer, a lower polarizer and liquid crystal molecules is shown in FIG. 3 and FIG. 4, where the optical axis directions of the upper polarizer 610 and the lower polarizer 620 are orthogonal to each other. FIG. 3 shows that when light is transmitted, the liquid crystal molecules 30 on the upper surface and lower surface are parallel to the directions of optical axes of their closer polarizers respectively, liquid crystal molecules 30 in the middle of the liquid crystal layer rotate gradually, and the light through the upper polarizer and the lower polarizer passes through the liquid crystal layer by rotating synchronously with the rotating of the liquid crystal molecules 30. FIG. 4 shows that when a voltage is applied, under the action of the electric field, liquid crystal molecules in the middle are all upright, and the liquid crystal molecules 30 on the upper surface and lower surface are still parallel to the directions of optical axes of their closer polarizers respectively. In this way, the light can not pass through the liquid crystal layer by the liquid crystal molecules. The liquid crystal layer is in a dark state.

Because the TN mode is a liquid crystal mode where a 90° twist angle of a liquid crystal molecule of nematic liquid crystal is used. In such a structure, the vertical rotation of the liquid crystal 30 causes a great change of permittivity of the liquid crystal layer, which seriously affects the judgment of sensitivity of the common electrode 210 and the common electrode 211 which also function as the common electrode and the touch electrode when serving as the touch electrode.

In the embodiment, the nematic liquid crystal 30 in the TN mode is replaced with ferroelectric liquid crystal 40, as shown in FIG. 5. The ferroelectric liquid crystal 40 is Semi-V shaped ferroelectric liquid crystal, and the Semi-V shape means that the morphology of the electro-optical characteristic alignment of the ferroelectric liquid crystal is Semi-V shaped. The morphology of the electro-optical characteristic alignment of a ferroelectric liquid crystal is generally V-shaped, which has a bi-stable state, and thus it is difficult to show grayscale display, therefore the V-shaped ferroelectric liquid crystal needs to be turned into Semi-V shape ferroelectric liquid crystal to achieve grayscale display, thereby realizing picture display with much complicated changes in color and luminance. The Semi-V shaped ferroelectric liquid crystal may be obtained by performing asymmetrical anchoring on the ferroelectric liquid crystal. The asymmetrical anchoring process is carried out in this way that: an alignment film on the first substrate 100 has an alignment direction antiparallel to that of an alignment film on the second substrate 200, and an rubbing alignment intensity different from that of the alignment film on the second substrate 200, which are realized by rubbing along antiparallel directions with different strength when rubbing the resin. In this way, the depths of the tiny gaps formed on the alignment films (an upper alignment film and a lower alignment film) of the first substrate 100 and the second substrate 200 are different.

In this way, in the case where no voltage is applied, the ferroelectric liquid crystal molecules 40 disposed between the upper alignment film and the lower alignment film are arranged along the rubbing alignment direction, with the long axis direction along a horizontal direction. The liquid crystal display unit is in the dark state. When a bright-state voltage is applied between the common electrodes 210, 211 and the pixel electrodes 120, a column of ferroelectric liquid crystal molecules 40 are twisted and functions as a liquid crystal light valve, and thus the liquid crystal display unit starts to display a picture. The ferroelectric liquid crystal 40 rotates according to the azimuth angle θ of its own helical structure, and compared with the vertical rotation in the TN mode, the rotation of the ferroelectric liquid crystal 40 realizes a rather small angle, similar to rotating in a horizontal plane. Therefore the use of the ferroelectric liquid crystal can reduce the change of the permittivity of the liquid crystal layer.

In this case, those skilled in the art can infer the formula of the transmittance ratio for the liquid crystal molecule rotating in a plane for display:

$$T \equiv \frac{i(\lambda)}{I_0} = \sin^2 \frac{2\pi \Delta n d}{\lambda} \sin^2 4\theta$$

It can be obtained that T gets a maximum value when θ=22.5°, so the transmittance ratio is the best when θ=22.5°. Therefore, preferably, in the embodiment, the azimuth angle θ of the ferroelectric liquid crystal is 22.5°, which may be achieved by controlling the temperature to which the ferroelectric liquid crystal is cooled down during the phase change when preparation of the ferroelectric liquid crystal by cooling, or by selecting the dipole moment of the ferroelectric liquid crystal molecule. In practical application, it may be customized by a liquid crystal manufacturer.

Second Embodiment

In a second embodiment, the liquid crystal in the liquid crystal layer of the capacitive embedded touch display device is twisted ferroelectric liquid crystal.

Specifically, the rubbing direction of alignment film on the surface of the first substrate is perpendicular to the rubbing direction of alignment film on the surface of the second substrate, both of the rubbing directions of alignment films are consistent to the optical axis of the polarizer. Other structures in the capacitive embedded touch display device are similar to those in the first embodiment.

In the second embodiment, the liquid crystal molecule layer in the twisted ferroelectric liquid crystal is perpendicular to the surface of the substrate, which are achieved by mutually perpendicular anchoring of the first substrate and the second substrate, i.e., the rubbing directions of the alignment films on the surfaces of the first substrate and the second substrate are mutually perpendicular, but director of the molecules between the two substrates are twisted to 90°. When a voltage is applied, anti-ferroelectric liquid crystal molecules only rotate almost in a plane. In such a structure, the arrangement of twisted ferroelectric liquid crystal molecules between the upper substrate and the lower substrate is the same as the arrangement of the liquid crystal molecules in the TN liquid crystal mode.

For the liquid crystal display mode of the liquid crystal display unit of the embodiment, a bright state is obtained when no voltage is applied, and when a voltage is applied, the spontaneous polarization directions of the twisted ferroelectric liquid crystal molecules are the same, and the liquid crystal molecules rotate almost in a plane, so a dark state is obtained. In this way, the variation of the permittivity of the liquid crystal layer is much smaller than that of the TN liquid crystal, which may effectively reduce the variations of the mutual capacitance and the parasitic capacitance caused by the rotation of the liquid crystal molecules. But the off-state response time is almost the same as that of the TN liquid crystal mode.

Similar to the first embodiment, in order to obtain a maximum transmittance ratio, the azimuth angle θ of the twisted ferroelectric liquid crystal is preferably 45°.

Third Embodiment

In a third embodiment, the capacitive touch unit in the embedded capacitive touch display device may be provided on one side of a color film. Specifically, one side of the liquid crystal layer is closer to the first substrate, and the other side of the liquid crystal layer is covered with a color film. The capacitive touch unit is disposed on the side of the color film relatively far from the liquid crystal layer, and the other side of the capacitive touch unit is toward the inner surface of the second substrate. The structure of the liquid crystal panel is similar to that of the first embodiment or the second embodiment.

The capacitive touch unit includes multiple parallel sensing electrodes and multiple parallel driving electrodes crossing the sensing electrodes, and the driving electrodes and the sensing electrodes are located in the same layer or in different layers.

Figure 6:
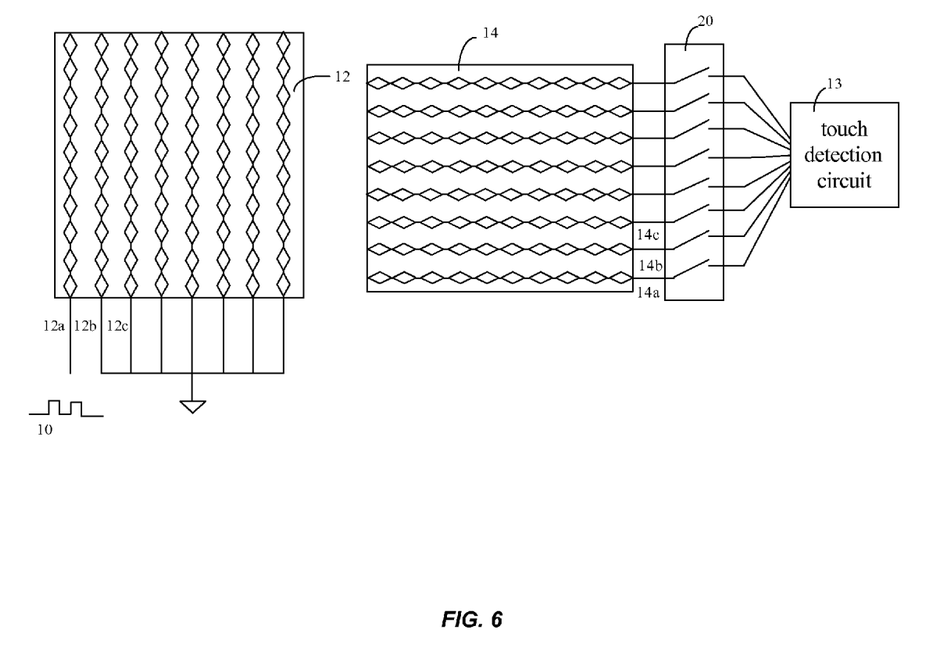
FIG. 6 is a top view of an implementation of a capacitive touch unit according to the third embodiment of the invention.

A top view of an embodiment is shown in FIG. 6, including a driving electrode layer 12 and a sensing electrode layer 14. The driving electrode layer 12 or the sensing electrode layer 14 is formed by multiple small-sized and diamond-shaped electrode patterns in which multiple parallel driving electrodes or multiple parallel sensing electrodes are formed by connecting the electrode patterns. The driving electrode layer 12 includes multiple driving electrodes 12*a*, 12*b*, 12*c*, . . . , 12*m*, and the sensing electrode layer 14 includes multiple sensing electrodes 14*a*, 14*b*, 14*c*, . . . , 14*n*, where m and n can be the same or different. In this embodiment, the driving electrodes cross the sensing electrodes, and all the diamond-shaped patterns of the driving electrodes are connected in the same horizontal direction. The sensing electrodes and the driving electrodes are covered with a dielectric layer having via holes, all diamond-shaped patterns of the sensing electrode are electrically connected by an interconnecting wire through the via holes. Or all diamond-shaped patterns of the sensing electrode are connected in the same horizontal direction. The sensing electrodes and the driving electrodes are covered with a dielectric layer having via holes, and all diamond-shaped patterns of the driving electrode are electrically connected by an interconnecting wire through the via holes.

In an embodiment where driving electrodes and sensing electrodes are of a bi-layer structure, the shape of the driving electrodes and the sensing electrodes in the driving electrode layer and the sensing electrode layer may be similar to that described above, i.e., the shape may be a diamond-shaped pattern. The driving electrodes cross the sensing electrodes, and the diamond-shaped patterns of the driving electrodes or the sensing electrodes are connected in the same horizontal direction. A transparent insulating layer is disposed between the driving electrodes and the sensing electrodes to serve as a dielectric layer for isolation.

The driving electrodes and the sensing electrodes include an indium tin metal oxide layer and a metal layer which are overlapped. The diamond-shaped patterns are formed of the indium tin metal oxide layer, and the edge of each diamond-shaped pattern is covered with the metal of the metal layer to form a net-like structure, which improves the whole conductive properties of the touch electrode. The grids of the metal layer are further covered with a protection layer.

Fourth Embodiment

In a fourth embodiment, the ferroelectric liquid crystal layer is filled with bi-stable ferroelectric liquid crystal molecules. The anchoring directions of alignment films on the first substrate and the second substrate are parallel, other structures are similar to or the same as those of the aforementioned embodiments. In such a structure, the bi-stable ferroelectric liquid crystal molecules only display in a bright state or a dark state, but don't display in the gray state. Therefore, the liquid crystal display unit according to the embodiment is only adapted to occasions where only bright state and dark state are needed for display, such as display of a character or display of a monochromatic identifier.

Although preferred embodiments of the present invention have been disclosed above, they are not intended to limit the present invention. Any possible changes and modifications may be made to the technical solutions of the present invention by those skilled in the art according to the method and the technical content disclosed above without departing from the spirit and the scope of the present invention. Therefore, the scope of protection of the present invention should be defined by the claims.

What is claimed is:

1. An embedded touch display device, comprising:
 a first substrate and a second substrate opposite to each other;
 a color film; and
 a liquid crystal display unit and a capacitive touch unit disposed between the first substrate and the second substrate,
 wherein the liquid crystal display unit comprises:
 a pixel electrode layer;
 a plurality of parallel driving electrodes;
 a plurality of parallel sensing electrodes;

a liquid crystal layer, wherein the liquid crystal layer includes a ferroelectric liquid crystal material, having a semi-V shaped morphology of electro-optical characteristics, in response to an applied voltage, wherein the ferroelectric liquid crystal is a twisted ferroelectric liquid crystal;

a pixel electrode layer disposed on the bottom surface of the liquid crystal layer; and a common electrode layer disposed on the top surface of the liquid crystal layer, wherein the common electrode layer includes a plurality of parallel common electrodes, wherein the common electrodes share the function of the driving electrodes or the sensing electrodes;

an upper alignment film reaching an upper surface of the liquid crystal layer and having a first alignment direction; and a lower alignment film reaching a lower surface of the liquid crystal layer and having a second alignment direction, wherein the first alignment direction is perpendicular to the second alignment direction, and wherein the upper alignment film has a same alignment intensity as an alignment intensity of the lower alignment film.

2. The embedded touch display device according to claim 1, wherein the first substrate and the second substrate are made of a transparent insulating material.

3. The embedded touch display device according to claim 1, wherein the pixel electrode layer and the common electrode layer are made of a transparent conductive material.

4. The embedded touch display device according to claim 1, wherein the plurality of parallel driving electrodes cross the common electrodes or the plurality of parallel sensing electrodes cross the common electrodes, and an insulating layer is disposed between the common electrodes and the driving electrodes or between the common electrodes and the sensing electrodes.

5. The embedded touch display device according to claim 1, wherein the driving electrodes or the sensing electrodes comprise an overlapping indium tin metal oxide layer and a metal layer wherein the metal layer has a net-like structure.

6. The embedded touch display device according to claim 5, wherein the metal layer has a surface covered with a protection layer which is a black matrix for shading.

7. The embedded touch display device according to claim 1, further comprising a planarization layer disposed between the liquid crystal layer and the color film.

8. The embedded touch display device according to claim 7, wherein the planarization layer is made of a transparent organic material.

* * * * *